United States Patent
Putnam et al.

(10) Patent No.: US 7,659,420 B2
(45) Date of Patent: Feb. 9, 2010

(54) DIHYDROXYACETONE-BASED POLYMERS

(75) Inventors: David A. Putnam, Ithaca, NY (US); Alexander Zelikin, Ithaca, NY (US)

(73) Assignee: Cornell Research Foundation, Inc, Ithaca, NY (US)

( * ) Notice: Subject to any disclaimer, the term of this patent is extended or adjusted under 35 U.S.C. 154(b) by 236 days.

(21) Appl. No.: 11/579,501

(22) PCT Filed: May 4, 2005

(86) PCT No.: PCT/US2005/015376

§ 371 (c)(1), (2), (4) Date: Nov. 3, 2006

(87) PCT Pub. No.: WO2005/108457

PCT Pub. Date: Nov. 17, 2005

(65) Prior Publication Data

US 2008/0194786 A1 Aug. 14, 2008

Related U.S. Application Data

(60) Provisional application No. 60/567,816, filed on May 5, 2004.

(51) Int. Cl.
C07C 69/96 (2006.01)
(52) U.S. Cl. .............. 558/264; 558/260; 558/263; 558/265; 528/196; 528/201; 528/371; 528/372; 528/373; 528/274
(58) Field of Classification Search ............... 528/370, 528/271, 196, 45, 201, 371, 372; 548/357.5; 558/260, 263, 264, 265
See application file for complete search history.

(56) References Cited

U.S. PATENT DOCUMENTS

| 5,458,872 | A * | 10/1995 | Durand ................ 424/59 |
| 6,037,467 | A | 3/2000 | Stahl et al. |
| 6,087,465 | A | 7/2000 | Seppala et al. |
| 6,231,837 | B1 * | 5/2001 | Stroud et al. .......... 424/59 |
| 2004/0253203 | A1 * | 12/2004 | Hossainy et al. ...... 424/78.08 |

OTHER PUBLICATIONS

1499.*
Akar, Ahmet, et al., "Synthesis of a polyspiroacetal", Makromol. Chem., Rapid Commun., 10, 127-130 (1989).
Burk, Robert M., et al., "A Safe and Efficient Method for Conversion of 1,2- and 1,3- Diols to Cyclic Carbonates Utilizing Triphosgene", Tetrahedron Letters, vol. 34, No. 3, pp. 395-398, 1993.
Ferroni, Edward L., et al., "A Three-Step Preparation of Dihydroxyacetone Phosphate Dimethyl Acetal", J. Org. Chem., 1999, 64, 4943-4945.
Liu, Zhi-Lan, et al., "Synthesis and Properties of Functional Aliphatic Polycarbonates", J. of Poly. Sci.: Part A: Poly. Chem., vol. 1, 4001-4006 (2003).
Jung, Sang-Hun, et al., "An Efficient Multigram-Scale Preparation of Dihydroxyacetone Phosphate", J. Org. Chem. 1994, 59, 7182-7184.
Strain, H.H., et al., "Polymerization of Dihydroxyacetone", J. Am. Chem. Soc. 56, 2649-2650 (1934).
Waagen, Viggo, et al., "Dihydroxyacetone dimers; Solution and Crystal Structure of Stereoisomers of 2,5-Diethoxy-1,4-Dioxane-2,5-Dimethanol", Tetrahedron, vol. 50, No. 33, pp. 10055-10060, 1994.
Wang, Lian-Sheng, et al., "Novel Biodegradable Aliphatic Polycarbonate Based on Ketal Protected Dihydroxyacetone", Macromol. Rapid Commun. 2004, 25, 959-963.
Yuasa, Hideya, et al., "Studies on the Unusual Stability of cis-2,5-Diethoxy-2,5- bis(hydroxymethyl)-1,4-dioxane", Tetrahedron 55 (1999) 2193-2204.
Zelikin, Alexander N., et al., "A Functionalizable Biomaterial Based on Dihydroxyacetone, an Intermediate of Glucose Metabolism", Biomacromolecules 2006, 7, 3239-3244.
Zawaneh, Peter N., et al., "Diblock Copolymers Based on Dihydroxyacetone and Ethylene Glycol: Synthesis, Characterization, and Nanoparticle Formulation", Biomacromolecules 2006, 7, 3245-3251.

* cited by examiner

*Primary Examiner*—RAndy Gulakowski
*Assistant Examiner*—Michael Leonard
(74) *Attorney, Agent, or Firm*—Bacon & Thomas, PLLC

(57) ABSTRACT

Chemically protected dihydroxyacetone and/or dimers are used to make polycarbonates, poly(acetal carbonate)s, poly (spiroacetal)s, polyesters and polyurethanes.

3 Claims, No Drawings

DIHYDROXYACETONE-BASED POLYMERS

CROSS-REFERENCE TO RELATED APPLICATIONS

This application is a 371 national phase of PCT Application No. PCT/US005/015376, filed 4 May 2005, which claims the benefit of U.S. Provisional Application No. 60/567,816, filed May 5, 2004, the whole of which is incorporated herein by reference.

TECHNICAL FIELD

The invention is directed to dihydroxyacetone (DHA)-based polymers and methods for making them.

BACKGROUND OF THE INVENTION

Polymeric biomaterials are in high demand for a number of biomedical and consumer applications. Two of the most prominent biomaterials are the polyesters of lactic and/or glycolic acid, and the polyanhydrides based on sebacic acid and 1,3-bis(carboxyphenoxy) propane. The number of applications for polymeric biomaterials is rapidly growing, leading to a corresponding need for the development of new kinds of biomaterials. DHA-based polymers should be an ideal candidate for this purpose. DHA is a precursor for the synthesis of glucose in humans and is also an intermediate in the metabolism of glucose in humans and is FDA-approved for topical use as the active ingredient in sunless tanning lotions. These characteristics suggest that polymers based on DHA would be advantageous materials since DHA degradation product will enter the normal metabolic pathway and minimize toxicity. However, DHA is not subject to facile polymerization because in solution its monomer is in equilibrium with its dimer, and is also reactive to primary amines. The difficulty of polymerizing DHA is evidenced by there being no publication or patent reports of a characterized polymer based on DHA.

SUMMARY OF THE INVENTION

It has been discovered herein that polymers can be made from DHA by proceeding from DHA monomer and/or dimer that have been chemically protected and, if desired, deprotecting after polymerization.

In its broad aspects the invention is directed to polymer comprising dihydroxy acetone monomer and/or dimer, having a number average molecular weight ranging from 500 to 1,000,000.

In narrower aspects the invention is directed to polycarbonates, poly(acetal carbonate)s, poly(acetal ester)s, poly(acetal urethane)s, poly(spiroacetal)s, polyesters, polyurethanes and combinations of said polymer types which meet the broad definition of polymer set forth in the above paragraph. In one embodiment the polycarbonate is functionalized by one or more nucleophiles.

One method for making herein involves the converting DHA to protected monomer, e.g., 2,2-dimethoxy-propane-1,3-diol having the structure:

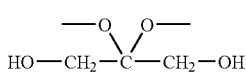

(III)

or to protected dimmer, e.g., having the structure:

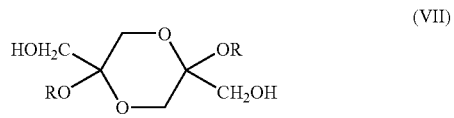

(VII)

where R is $C_1$-$C_{10}$ straight chain or branched alkyl.

A method for making the polycarbonates comprises converting (III) to 2,2-dimethoxy-propylene carbonate (IV), then polymerizing (IV) in the presence of a ring opening polymerization catalyst or initiator to produce protected polymer (V) and if desired deprotecting to convert dimethoxy to carbonyl and produce deprotected polycarbonate (VI). Structures for (IV), (V) and (VI) are set forth in the detailed description. Functionalization of (VI) with one or more nucleophiles is readily carried out by incubating the polycarbonate with a solution of nucleophile functionalizing agent.

A method herein for making the poly(acetal carbonate)(s) of the invention comprises converting (VII) to poly(acetal carbonate).

A method herein for producing the poly(spiroacetal)s of the invention comprises subjecting (III) or (VII) to dealcoholysis.

A method herein for producing the polyesters of the invention comprises subjecting (III) or (VII) and a dicarboxylic acid to dehydration.

A method for producing the polyurethanes of the invention comprises reacting (III) or (VII) with diisocyanate OCN-RNCO where R is $C_1$-$C_{10}$ straight chain or branched alkyl, cyclohexyl, dicyclohexyl, norbornyl, toluene, diphenyl methane, naphthalene or other aromatic or converting (III) or (VII) to the corresponding bischloroformate and reacting the bischloroformate with a diamine.

The number average molecular weights herein are determined by gel permeation chromatography using polystyrene standards.

DETAILED DESCRIPTION

The broadly described polymer is appropriately made using dihydroxyacetone monomer and/or dimer that are chemically protected, e.g., from protected dihydroxyacetone monomer where the carbonyl group of the monomer is protected, e.g., from 2,2-di-$C_1$-$C_{10}$ alkoxy-propane-1,3-diol, e.g., from 2,2-dimethoxy-propane-1,3-diol (protected monomer, denoted (III)), or, for example, where the carbonyl group of the monomer is protected with methoxybenzyl or benzyloxy or allyloxy, or from protected dimer where the hydroxyl groups of the dimer are protected, e.g., from 2,5-di-$C_1$-$C_{10}$ alkoxy-2,5-bis(hydroxymethyl)-[1,4]-dioxane (protected dimer denoted (VII)). The 2,2-dimethoxy-propane-1,3 diol is readily made from combination of DHA monomer and dimer as described in Ferroni, E. L., et al, J. Org. Chem 64, 4943-4945 (1999); a detailed synthesis of (III) is set forth in Example 1 hereinafter. Detailed syntheses of (VII) are set forth in Examples 2 and 3 hereinafter.

The polycarbonates herein in protected form are poly(2,2-dimethoxy-propylene carbonate) and in deprotected form are poly(2-oxypropylene carbonate). The protected form can be made by converting (III) to

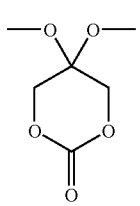

e.g., by treating (III) with either triphosgene/pyridine or ethylchloroformate/triethylamine and subjecting (IV) to ring opening polymerization using a coordination catalyst or initiator (e.g. an organotin catalyst, e.g. stannous octoate (preferred), dibutyl tin laurate, dibutyltin diacetate or dibutyltin hexoate; or antimony; or zinc), to produce poly(2,2-dimethoxy-propylene carbonate), that is

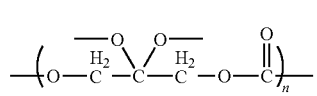

where n is a number such as to provide a number average molecular weight ranging from 500 to 1,000,000. A detailed synthesis of (V) from (III) is given in Example 4 hereinafter. The protected polymer (V) is readily converted to deprotected form poly(2-oxypropylene carbonate), that is

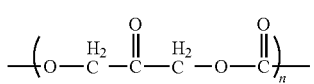

where n is a number such as to provide a weight average molecular weight ranging from 500 to 1,000,000. A detailed synthesis of (VI) from (V) is given in Example 5 hereinafter. The compound (VI) can be functionalized by one or more nucleophiles by suspending or dissolving (VI) in a liquid such as water and adding functionalizing agent. Functionalization of (VI) can also be performed by placing a functionalizing agent onto a surface consisting of (VI). Functionalizing agent can be, for example, an amine. Another way to make a functionalized form of (VI) is to create (VI) in situ from a deprotection of (V) in the presence of functionalizing nucleophile; this reaction can also be performed in two steps rather than in situ. A detailed example of functionalizing (VI) using 2,2,-dimethyl-1-methyl ethyl diamine as the functionalizing agent is given in Example 6 hereinafter. A detailed route of functionalizing using phenethylamine is given in Example 7. Other useful functionalizing amines include, for example, aliphatic and cycloaliphatic monoamines, e.g., amino sugars, amino lipids, amino acids, methylamine, ethylamine, propylamine, butylamine, tert-butylamine, allylamine, dimethylamine, diethylamine, diallylamine, cyclohexylamine; aromatic monamines, e.g., aniline, o-toluidine, 2,3-xylidine, 3,4-xylidine, o-aminophenol m-aminophenol, m-phenetidine, m-aminobenzaldehyde, aminobenzaldehyde, aminobenzonitrile, 2-aminobiphenyl, 4-aminobiphenyl, 2-aminophenyl phenyl ether, 3-aminophenyl phenyl ether, 2-aminobenzophenone, 3-aminobenzophenone, 3-aminophenyl phenyl sulfide, naphthylamine, amino-2-naphthol, 2-amino-1-naphthol; aliphatic and cycloaliphatic diamines, e.g., 1,2-diaminoethane, 1,2-diaminopropane, 1,3-diaminopropane, 1,4-diaminobutane, 1,6-diaminohexane, 1,6-diamino-2,2,4-trimethylhexane, 1,6-diamino-2,4,4-trimethylhexane, 1,4- and 1,5-diaminohexane, 2,4- and 2,6-diamino-1-methylcyclohexane, 1-amino-3,3,5-trimethyl-5-aminomethylcyclohexane, 1,3- and 1,4-bis(aminomethyl)cyclohexane, 4,4'-diaminodicyclohexylmethane and α,ω-diamino polyethers prepared by amination of polyalkylene oxides with ammonia; aromatic diamines, e.g., para-phenylenediamine, 4,4'-diamino-diphenylpropane, 4,4'-diamino-diphenylmethane, phenylene diamine, 1,5-diamino-naphthalene, bisaniline-p-xylidene, 3,3'-diaminobenzopheneone, 4,4'-diaminobenzophenone, 3,3'-diaminodiphenylether, 4,4'-diaminodiphenylmethane, 3,3'-dimethyl benzidine; and triamines, e.g., 1,3,5-triaminobenzene, 4,4',4''-triaminotriphenylmethane, 4,4',4''-triaminotriphenylcarbinol and triaminophenyl benzene. The monamines can give functionality to the surface. The diamines and triamines can be crosslinkers.

The poly(acetal carbonate)s herein have the formula

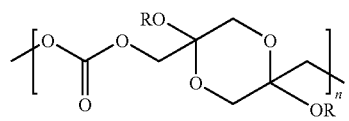

where R is $C_1$-$C_{10}$ straight chain or branched alkyl and n is a number such as to provide a number average molecular weight ranging from 500 to 1,000,000. The poly(acetal carbonate)s (VIII) can be prepared by adding triphosgene to a solution of (VII) in pyridine/methylene chloride and recovering product. Two examples of poly(acetal carbonate) synthesis are given in Example 9 hereinafter, one where (VII) is 2,5-diethoxy-2,5-bis(hydroxy methyl)-[1,4]-dioxane and the other where (VII) is 2,5-diisopropoxy-2,5-bis(hydroxy methyl)-[1,4]-dioxane.

The poly(spiroacetal)s here have the formulas

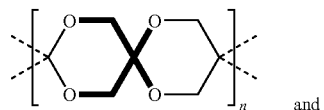

and

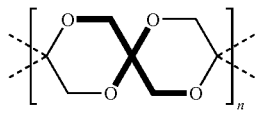

where n is a number such as to provide a number average molecular weight ranging from 500 to 1,000,000. Compound (IX) is prepared by subjecting (III) to dealcoholysis, and compound (X) is prepared by subjecting (VII) to dealcoholysis. Detailed examples of synthesis of (IX) and synthesis of (X) are given in Example 10 hereinafter.

The polyesters herein have the structural formulas

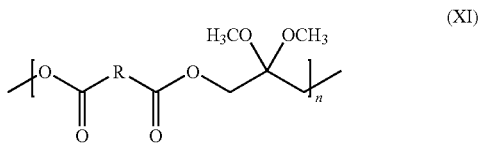 (XI)

where R is $C_1$-$C_{10}$ straight chain or branched alkyl, cyclohexyl, dicyclohexyl, norbornyl, toluene, diphenylmethane, naphthalene or other aromatic and n is a number such that the number average molecular weight ranges from 500 to 1,000,000; and

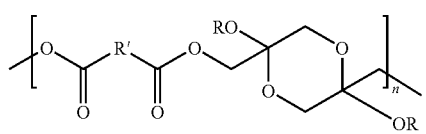 (XII)

where R is $C_1$-$C_{10}$ straight chain or branched alkyl and R' is $C_1$-$C_{10}$ straight chain or branched alkyl, cyclohexyl, dicyclohexyl, norbornyl, toluene, diphenylmethane, naphthalene or other aromatic and n is a number such that the number average molecular weight ranges from 500 to 1,000,000.

Compound (XI) can be prepared by subjecting (III) and a dicarboxylic acid to dehydration. Suitable dicarboxylic acids include, for example, oxalic acid, malonic acid, succinic acid, glutaric acid, adipic acid, pimelic acid, suberic acid, sebacic acid, phthalic acid, isophthalic acid and terephthalic acid. A detailed synthesis of (XI) from (III) and succinic acid is given in Example 11 hereinafter. Compound (XI) except that dimethoxy is converted to carbonyl, is prepared by treating (XI) with trifluoroacetic acid. Functionalizing of (XI) where dimethoxy is converted to carbonyl, with one or more nucleophiles can be carried out, e.g., by suspending or dissolving the compound in water and adding functionalizing agent or by placing functionalizing agent onto a surface consisting of the compound; the functionalizing agent can be an amine, e.g., selected from the group consisting of those listed in conjunction with functionalizing (VI) or mixtures thereof.

Compound (XII) can be prepared by subjecting (VII) and a dicarboxylic acid to dehydration. The dicarboxylic acids named above for synthesis of (XI) are also suitable for synthesis of (XII). The procedure is analogous to the detailed procedure for synthesis of (XI) in Example 11.

The polyurethanes herein have the structure formulas

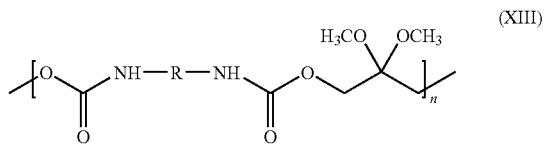 (XIII)

where R is $C_1$-$C_{10}$ straight chain or branched alkyl, cyclohexyl, dicyclohexyl, norbornyl, toluene, diphenylmethane, naphthalene or other aromatic and n is a number such that the number average molecular weight ranges from 500 to 1,000,000; and

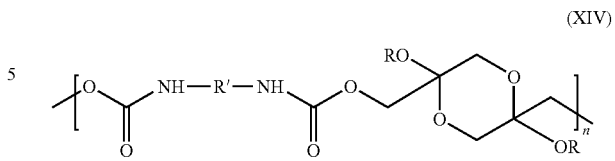 (XIV)

where R is $C_1$-$C_{10}$ straight chain or branched alkyl and R' is $C_1$-$C_{10}$ straight chain or branched alkyl, cyclohexyl, dicyclohexyl, norbornyl, toluene, diphenylmethane, naphthalene or other aromatic and n is a number such that the number average molecular weight ranges from 500 to 1,000,000. Structure (XIV) is of a poly(acetal urethane).

The compound (XIII) can be made by reacting (III) with a diisocyanate OCN—R—NCO where R is the same as for (XIII) or by converting (III) to the corresponding bischloroformate and reacting the bischoroformate with a diamine. Suitable diisocyanates include, for example, 1,4-diisocyanatobutane, 1,6-diisocyantohexane (HDI), 2-methyl-1,5-diisocyanatopentane, 1,5-diisocyanato-2,2-dimethylpentane, 2,2,4- or 2,4,4-trimethyl-1,6-diisocyanatocyclohexane, 1,10-diisocyanatodecane, 1,3 and 1,4-diisocyanato-cyclohexane, 1,3- and 1,4-bis(isocyanatomethyl)-cyclohexane, 1-isocyanato-3,3,5-trimethyl-5-isocyantomethylcyclohexane(isophorone diisocyante, IPDI), 4,4'-diisocyanatodicyclohexyl-methane, 1-isocyanato-1-methyl-4(3)-isocyanato-methylcyclohexane, bis-(isocyanatomethyl)-norbornene, 1,3- and 1,4-bis-(1-isocyanato-1-methylethyl)-benzene (TMXDI), 2,4- and 2,6-diisocyanatotoluene (TDI), 2,4' and 4,4'-diisocyanato-diphenylmethane (MDI), 1,5-diisocyanatonaphthalene or any mixture of such diisocyanates. Suitable diamines are, for example, those recited above as functionalizing agents. The compound (XIII) except that dimethoxy is converted to carbonyl is prepared by reacting (XIII) with trifluoroacetic acid. (XIII) where dimethoxy is converted to carbonyl can be functionalized with one or more nucleophiles by suspending or dissolving the compound in water and adding functionalizing agent or by placing functionalizing agent onto a surface consisting of the compound; the functionalizing agent can be an amine, e.g., selected from the group consisting on those listed in conjunction with functionalizing (VI) or mixtures thereof.

The compound (XIV) can be prepared by reacting (VII) with diisocyanate OCN—$R^1$—NCO where $R^1$ is the same as $R^1$ for (XIV) or by converting (VII) to the corresponding bischloroformate and reacting the bischloroformate with a diamine. Exemplary diisocyanates and diamines are the same as those in the paragraph directly above.

The synthesis of intermediates of polymers of the invention and polymers of the invention are illustrated by the following examples.

EXAMPLE 1

Synthesis of 2,2-dimethoxy-propane-1,3-diol (III)

2,2-dimethoxy-propane-1,3-diol (III) was synthesized according to the method of Ferroni, E. L., et al., J. Org. Chem., 64, 4943-4945 (1999). DHA dimer (25 g, 0.139 mole), trimethylorthoformate (30.4 ml, 0.278 mole) and p-toluenesulfonic acid (100 mg) were combined in 300 mL of methanol and stirred for 12 h. At this time 300 mg of $Na_2CO_3$ were added and the reaction mixture was stirred for an additional 12 h, after which the mixture was filtered and solvent was removed in vacuo. The resulting solid was recrystallized from ethyl ether to give 17.5 g of III (47%). $^1$H NMR ($D_2O$) δ 3.58 (s; 4H), 3.24 (s; 6H). Anal. Calc.: C, 44.12; H, 8.82. Found: C, 44.50; H, 8.78.

EXAMPLE 2

Synthesis of 2,5-di-ethoxy-2,5-bis(hydroxymethyl)-[1-4]-dioxane (VII)

Synthesis of 2,5-diethoxy-2,5-bis(hydroxymethyl)-[1,4]-dioxane (VII) was carried out as follows: DHA (32 g, 177.8 mmole), triethylorthoformate (60 ml, 360 mmole), p-TsOH (128 mg) were combined in 300 mL of ethyl alcohol and stirred for 24 hours, after which time 400 mg of $Na_2CO_3$ were added and the reaction mixture was stirred for an additional 30 minutes and filtered. Removal of the solvent and residual triethylorthoformate in vacuo and recrystallization of the product from ethyl acetate resulted in title compound (31 g, 74%). $^1$H NMR ($CDCl_3$) δ 1.14-1.24 (6H), 3.4-3.9 (12H). Anal Calc: C, 50.85; H, 8.47. Found: C, 50.89; H, 8.69.

EXAMPLE 3

Synthesis of 2,5-diisopropoxy-2,5-bis(hydroxymethyl)-[1,4]-dioxane (VII)

2,5-diisopropoxy-2,5-bis(hydroxymethyl)-[1,4]-dioxane was synthesized from DHA and triisopropylorthoformate in 2-propanol with p-TsOH as catalyst using the same protocol described in Example 2 for compound diethoxy derivative. $^1$H NMR ($CDCl_3$) δ 1.18-1.26 (12H); 3.4-4.2 (10H). Anal. Calc. C, 54.53; H, 9.15. Found: C, 54.45; H, 9.06.

EXAMPLE 4

Synthesis of poly(2,2-dimethoxypropylene carbonate) (V)

2,2-dimethoxypropylene carbonate (IV) was synthesized as follows: a) A solution of triethylamine (14.7 ml, 0.1 mole) in 30 mL of THF was added dropwise to a solution of III (7.15 g, 52.5 mmole) and ethylchloroformate (10 ml, 0.1 mole) in 100 mL of THF at 0° C. After addition was complete, the reaction mixture was stirred at room temperature for 3 hours, after which time the mixture was filtered and THF was removed in vacuo. The product was recrystallized from THF-ethyl ether to yield IV (2.5 g, 30%). b) To a solution of III (5 g, 36.76 mmole) and pyridine (18 ml, 0.2 mole) in 100 mL of $CH_2Cl_2$ at −70° C. was added a solution of triphosgene (5.5 g, 18.5 mmole) in 70 mL of $CH_2Cl_2$. After addition was complete, the mixture was allowed to warm to room temperature and stirred overnight, after which time the reaction mixture was subsequently washed with ammonium acetate, aq. HCl; aq. $NaHCO_3$ and brine and dried over sodium sulfate. After removal of the solvent, the product was isolated by flash chromatography on silica gel (eluent—ethyl acetate) and recrystallized from ethanol-hexanes to yield IV (4.5 g, 75%).
$^1$H NMR ($CDCl_3$): δ 4.28 (s; 4H), 3.30 (s; 6H). Anal. Calc.: C, 44.44; H, 6.17. Found: C, 44.58; H, 6.29.

Poly(2,2-dimethoxypropylene carbonate) (V) was synthesized as follows: 2,2-dimethoxypropylene carbonate (IV) and $Sn(Oct)_2$ at varied monomer to initiator ratio (100:1-400:1) were placed into a glass vessel and evacuated. The reaction was carried out at 100° C. for as long as efficient magnetic stirring was possible (1-2 h), after which time the mixture was dissolved in methylene chloride and the polymer was obtained by precipitation into methanol. Average polymerization yield was 65%. Molecular weights $M_n$ were determined by GPC with THF as eluent and polystyrene standards and ranged from 6000 to 25000 with polydispersities ranging from 1.4 to 1.5. $^1$H NMR ($CDCl_3$): δ 4.28 (s; 4H), 3.30 (s; 6H). $^{13}$C NMR ($CDCl_3$): δ 154 (—O—CO—O—), 99 (acetal carbon), 63 (—CH2-), 49 (—OCH$_3$). Anal. Calc.: C, 44.44; H, 6.17. Found: C, 44.26; H, 6.04.

EXAMPLE 5

Synthesis of Poly(2-oxypropylene carbonate) (VI)

Poly(2-oxypropylene carbonate) (VI) was synthesized as follows: Deacetalization of poly(2,2-dimethoxypropylene carbonate) (V) was carried out in trifluoroacetic acid—water mixture (4:1 v/v) at polymer concentration of 0.1 mg/ml for 15 minutes during which time the title polymer precipitated. The solid product was collected, washed several times with methanol and dried under vacuum. Anal. Calc.: C, 41.39; H, 3.47. Found: C, 41.34; H, 3.33.

To determine whether the trifluoroacetic acid degraded the polymer backbone, two infrared spectroscopy scans were carried out, one on (V) and one on (VI). The presence of the C—O stretch at 1700 which is distinctive for carbonyl groups, in the IR scan on (VI) showed the polymer carbonyl remains intact following deprotection with TFA:$H_2O$.

EXAMPLE 6

Nucleophilic functionalization of (VI) using 2,2-dimethyl-1-methylethyldiamine 2,2-dimethyl-1-methylethyldiamine was added in excess to a suspension of (VI) in unbuffered water at room temperature. The solid (I) dissolved in the water within 1 hour and the functionalized polymer was analyzed by NMR spectroscopy. Modification of VI was also carried out by mixing (VI) with amine and precipitating the formed clear solution into hexane; precipitated polymer was dried, dissolved in water and analyzed by NMR spectroscopy. $^{13}$C NMR revealed the absence of the characteristic C2 ketone located between 180 and 220 ppm demonstrating that no unreacted C2 ketone groups remained in the polymer (i.e., functionalization was complete.)

EXAMPLE 7

Functionalization with Phenethylamine

To a suspension of (VI) (500 mg) in THF was added phenethylamine (0.27 microliters) and $NaBH_3CN$ (670 mg) and the mixture was stirred overnight at 0° C. whereupon the polymer dissolved. NMR spectroscopy did not allow a definitive determination of the final polymer structure. To show that the polymer dissolved due to reaction with the carbonyl, a polymer analogue, carbonic acid 3-ethoxycarbonyloxy-2-oxo-propyl ester ethyl ester, was synthesized and reacted (500 mg) with phenylethylamine (0.27 microliters) at 0° C. for 1 hr, after which $NaBH_3CN$ (670 mg) were added and the mixture stirred for another 3 hours at room temperature. The isolated product was subjected to $^{13}$C NMR, showing a quantitative elimination of the carbonyl, and the addition of the phenylethylamine.

EXAMPLE 8

Amine-Containing Polymer Binds to (VI) But Not to (V)

(V) was spin coated onto glass slides. Half of the coatings were deprotected using TFA/H$_2$O over 15 minutes. The slides were washed with deionized water and dried, then covered with a phosphate-buffered saline solution of a fluorescently labeled amine-containing polymer, namely polylysine conjugated with fluorescein (polylysine-FTIC), for 30 minutes, washed with deionized water again, and dried under N$_2$ gas. Images were obtained using a fluorescent microscope, and bright fields indicate that the polylysine-FTIC reacts with (VI), the unprotected form, but not with (V) the protected form. This characteristic is associated with, but not limited to, usefulness as a bioadhesive for surgical sutures or wound closure dressings.

EXAMPLE 9

Synthesis of Poly(acetal carbonates) (VIII)

The polycondensation protocol for precondensing these was as follows: To a solution of diol (y mmole) in 3.5×y mmole of pyridine and z ml of CH$_2$Cl$_2$ was added dropwise a solution of triphosgene (5-z ml per gram of diol) at varied temperature and rate of addition. After complete addition, the mixture was allowed to stir for an additional 5 minutes and directly precipitated into methanol. The resulting polymer was collected by filtration, washed with methanol and dried under vacuum. The diol starting materials were compounds (VII) of Examples 2 and 3.

pEAC (R=-Et): $^1$H NMR (CDCl$_3$) δ 1.10-1.25 (6H), 3.40-3.90 (8H), 4.0-4.4 (4H). $^{13}$C NMR (CDCl$_3$) δ 154 (—O—CO—O—), 94-98 (apical C), 64-67 (ring —$\underline{C}$H$_2$— and —$\underline{C}$H$_2$—OCOO—), 57 (—$\underline{C}$H$_2$—CH$_3$), 15 (—$\underline{C}$H$_3$). Anal. Calc. C, 50.38; H, 6.92. Found: C, 49.71; H, 7.23.

pPAC (R=-i-Pr): $^1$H NMR (CDCl$_3$) δ 1.1-1.3 (12H), 3.5-4.3 (10H). $^{13}$C NMR (CDCl$_3$) δ 154 (—O—CO—O—), 94-98 (apical C), 63-67 (ring —$\underline{C}$H$_2$—; —$\underline{C}$H$_2$—OCOO— and —$\underline{C}$H—), 24 (—$\underline{C}$H$_3$). Anal. Calc. C, 53.78; H, 7.64. Found: C, 55.05; H, 7.91.

EXAMPLE 10

Synthesis of Poly(Spiroacetal) (IX) and (X)

Typical protocol for the synthesis of poly(spiroacetals) were as follows: Monomer, 2,2-dimethoxy-propane-1,3-diol (for producing IX) or 2,5-diethoxy-2,5-bis(hydroxymethyl)-[1,4]-dioxane (for producing X), (1 g) with diluent, DMSO or dimethoxytetraoxyethylene, 0 to 400 μl, were heated up to 100° C. and stirred to form clear solution. p-Toluenesulfonic acid (5 mg) was added to reaction mixture, after which time it was stirred at 100° C. under vacuum for 15 minutes or until efficient stirring was possible. The mixture was cooled to room temperature, dissolved in methylene chloride (1 ml) and precipitated from ethyl ether.

Poly(2,6-spiroacetal) (IX). $^1$H NMR (CDCl$_3$ or DMSO) δ 3.0-4.2 (br). $^{13}$C NMR (CDCl$_3$ or DMSO) δ 89-99 (ring apex carbons), 62-64 (ring —CH$_2$— groups), 49 (terminal —O$\underline{C}$H$_3$). Anal Calc: C, 47.37; H, 5.26. Found: C, 50.02; H, 7.26. M$_w$ (0.9-3.0)×10$^3$; typical M$_w$/M$_n$ 1.5.

Poly(2,5-spiroacetal) (X). $^1$H NMR (CDCl$_3$ or DMSO) δ 3.0-4.2 (br), 1.2 (—CH$_3$). $^{13}$C NMR (CDCl$_3$ or DMSO) δ 89-99 (ring apex carbons), 56-71 (ring —CH$_2$— groups, —O$\underline{C}$H$_2$CH$_3$ and terminal —$\underline{C}$H$_2$OH), 16 (terminal —OCH$_2$$\underline{C}$H$_3$). Anal Calc: C, 47.37; H, 5.26. Found: C, 50.45; H, 7.12. M$_w$ (0.9-3.3)×10$^3$; typical M$_w$/M$_n$ 1.5.

EXAMPLE 11

Synthesis of Polyester (XI)

Poly(2,2-dimethoxypropylene succinate) (XI) was synthesized as follows: 2,2-dimethoxy-1,3-propane diol (III) (1 g, 7.35 mmole) and succinic acid (0.867 g, 7.35 mmole) were combined in 5 ml of methylene chloride. To this mixture dicyclohexylcarbodiimide (3.03 g, 14.70 mmole) and (dimethylamino)pyridine (10 mg) were added and reaction mixture was stirred for 24 h. After this, reaction mixture was diluted with methylene chloride to appr. 10 ml and filtered; excess of solvent was removed in vacuo, polymer was obtained be precipitating into methanol to yield 0.9 g (56%) of title polymer. M$_w$ 6.0×10$^3$; M$_w$/M$_n$ 1.4.

When 2,5-di-C$_1$-C$_{10}$ alkoxy-2,5-bis(hydroxymethyl)-[1,4]-dioxane (VII) is substituted for (III) in the above synthesis, poly(acetal ester) is produced.

Variations

The foregoing description of the invention has been presented describing certain operable and preferred embodiments. It is not intended that the invention should be so limited since variations and modifications thereof will be obvious to those skilled in the art, all of which are within the spirit and scope of the invention.

What is claimed is:

1. Poly (2,2- dimethoxy propylene carbonate) having the formula

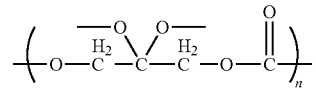

where n is a number such as to provide a number average molecular weight ranging from 500 to 1,000,000.

2. Polymer containing dihydroxy acetone monomer and /or dimer having a number average molecular weight ranging from 500 to 1,000,000 which is poly (2-oxypropylene carbonate) having the formula

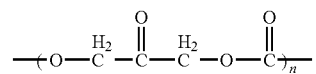

where n is a number such as to provide a number average molecular weight ranging from 500 to 1,000,000.

3. The polymer of claim 2 which is functionalized by one or more nucleophiles.

* * * * *

UNITED STATES PATENT AND TRADEMARK OFFICE
CERTIFICATE OF CORRECTION

PATENT NO. : 7,659,420 B2  Page 1 of 1
APPLICATION NO. : 11/579501
DATED : February 9, 2010
INVENTOR(S) : Putnam et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 331 days.

Signed and Sealed this

Twenty-eighth Day of December, 2010

David J. Kappos
*Director of the United States Patent and Trademark Office*